United States Patent
Kim et al.

(10) Patent No.: US 9,257,232 B2
(45) Date of Patent: Feb. 9, 2016

(54) MULTILAYER ELECTRONIC COMPONENTS WITH AN INHIBITOR-INFLUENCING LAYER AND METHOD FOR MANUFACTURING THE SAME

(71) Applicant: Samsung Electro-Mechanics Co., Ltd., Suwon, Gyunggi-do (KR)

(72) Inventors: Jong Han Kim, Suwon-si (KR); Su Hwan Cho, Suwon-si (KR); Doo Young Kim, Suwon-si (KR); Ji Young Park, Suwon-si (KR); Jae Yeol Choi, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 142 days.

(21) Appl. No.: 13/801,102

(22) Filed: Mar. 13, 2013

(65) Prior Publication Data

US 2013/0294008 A1   Nov. 7, 2013

(30) Foreign Application Priority Data

May 4, 2012  (KR) .......................... 10-2012-0047686

(51) Int. Cl.
  *H01G 4/008*  (2006.01)
  *H01G 4/30*  (2006.01)

(52) U.S. Cl.
  CPC .............. *H01G 4/008* (2013.01); *H01G 4/0085* (2013.01); *H01G 4/30* (2013.01)

(58) Field of Classification Search
  CPC ........ H01G 4/0085; H01G 4/008; H01G 4/30
  USPC ................................................ 361/305, 321.2
  See application file for complete search history.

(56) References Cited

U.S. PATENT DOCUMENTS

| | | | | |
|---|---|---|---|---|
| 7,006,345 B2 * | 2/2006 | Nakano et al. | ............. | 361/321.5 |
| 7,042,707 B2 * | 5/2006 | Umeda et al. | ............. | 361/321.2 |
| 7,265,072 B2 * | 9/2007 | Watanabe et al. | ............. | 501/136 |
| 7,518,849 B2 * | 4/2009 | Ito et al. | ...................... | 361/321.2 |
| 7,528,088 B2 * | 5/2009 | Umeda et al. | ................. | 501/139 |
| 8,335,073 B2 * | 12/2012 | Komatsu et al. | ........... | 361/321.5 |
| 2006/0043523 A1 | 3/2006 | Ito et al. | | |
| 2006/0254693 A1 * | 11/2006 | Murosawa et al. | ........ | 156/89.14 |
| 2008/0233270 A1 | 9/2008 | Satou et al. | | |

FOREIGN PATENT DOCUMENTS

| | | |
|---|---|---|
| JP | 08-241828 A | 9/1996 |
| JP | 2005-259638 A | 9/2005 |
| JP | 2005-263502 A | 9/2005 |

(Continued)

OTHER PUBLICATIONS

Japanese Office Action dated Mar. 31, 2015 issued in Japanese Patent Application No. 2013-054963 (English translation).

*Primary Examiner* — David M Sinclair
(74) *Attorney, Agent, or Firm* — McDermott Will & Emery LLP

(57) ABSTRACT

A multilayer electronic component is provided having a structure in which a dielectric layer and an internal electrode layer are alternately laminated. The internal electrode layer includes metal powder and an inhibitor. The inhibitor includes 0.5 to 20 mol % of a Ca component based on 100 mol % of a barium titanate (BT) base material. A method for manufacturing the same is also provided.

11 Claims, 1 Drawing Sheet

(56) References Cited

FOREIGN PATENT DOCUMENTS

| | | |
|---|---|---|
| JP | 2006-073623 A | 3/2006 |
| JP | 2006-206362 A | 8/2006 |
| JP | 2007-173480 A | 7/2007 |
| JP | 2007-258476 A | 10/2007 |

* cited by examiner

- PRIOR ART -

MULTILAYER ELECTRONIC COMPONENTS WITH AN INHIBITOR-INFLUENCING LAYER AND METHOD FOR MANUFACTURING THE SAME

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2012-0047686, entitled filed May 4, 2012, which is hereby incorporated by reference in its entirety into this application.

BACKGROUND OF THE INVENTION

1. Field of the Invention

The present invention relates to multilayer electronic components and methods for manufacturing the same.

2. Description of the Related Art

A multilayer ceramic condenser (hereinafter, MLCC) is manufactured by printing a conductive paste on the formed dielectric layer sheet with screen, gravure, or other methods to print an internal electrode layer and laminating the sheet on which the internal electrode layer is printed.

The conductive paste used at this time mainly consists of inorganic matter such as metal powder such as Ni and Cu and ceramic powder (inhibitor) and organic matter such as dispersants, resins, additives, and solvents.

Generally, since the metal powder used in the internal electrode paste, such as Ni and Cu, has a lower melting point than ceramic powder used in a dielectric layer, a temperature at which sintering shrinkage starts is low. Therefore, since ceramic powder is added as an inhibitor to shift a shrinkage start temperature to high temperature to be similar to that of a dielectric as much as possible and the ceramic powder used as an inhibitor is absorbed into the dielectric layer in the process of firing the internal electrode layer to ultimately contribute to dielectric characteristics, the inhibitor is designed with the same or similar composition to the dielectric layer. In the general case, barium titanate ($BaTiO_3$), which is the same as the composition of the dielectric layer, is used as a main component of the inhibitor, and various oxide sub-components may be used to increase a sintering start temperature.

An internal electrode is sintered through the following process in manufacture of an MLCC.

A step in which an inhibitor leaks out while metal power shrinks at 800 to 1000° C. (1). A step in which an internal electrode layer is connected while a dielectric layer shrinks at 1000 to 1100° C. (2). A step in which the internal electrode layer is agglomerated while the dielectric layer becomes dense at more than 1100° C. (3).

Therefore, as a sintering temperature is increased, electrode disconnection is increased, and as particulate metal powder is used for thinning, electrode disconnection is more increased.

In the conventional methods, electrode connectivity is improved by using ceramic powder with the same or smaller size than that of metal powder used in an internal electrode layer as an inhibitor to restrain contact between the metal powders and thus increase a shrinkage start temperature of the internal electrode.

Generally, since an inhibitor is absorbed into a dielectric layer after firing to ultimately contribute to dielectric characteristics, it is designed with the same or similar composition to the dielectric layer. Further, since the inhibitor should be distributed between metal particles to limit sintering, it has generally a smaller particle size than metal powder and the amount thereof is adjusted according to a firing temperature of a chip.

In the MLCC, the inhibitor component added to the internal electrode layer moves to the dielectric layer during sintering to affect the characteristics of the dielectric. Since ultrathin/ultrahigh capacity MLCCs include a thin dielectric, the effect of the inhibitor component is great.

According to the trend of high capacity and thinning of the MLCC, the internal electrode layer as well as the dielectric layer becomes thinner, and a thinner internal electrode is needed. However, unless a firing temperature of the dielectric is remarkably reduced, as an internal electrode becomes thinner, it is difficult to form an internal electrode with excellent connectivity.

Therefore, an inhibitor is added to the internal electrode layer to suppress the sintering shrinkage of the internal electrode. The thinner the internal electrode is, the greater the effect of the inhibitor is. When many oxygen vacancies are formed on the interface between the electrode and the dielectric, electrical characteristics such as withstand characteristics, accelerated life, and capacity are badly affected.

The role of the inhibitor is to lower a temperature at which sintering shrinkage starts as much as possible. However, when the sintering of metal used as an internal electrode starts, most of the inhibitors are pushed out to the dielectric layer or some of them are trapped between the metal and the inhibitors pushed out to the dielectric layer react with the dielectric layer so that firing is performed.

Therefore, a layer greatly influenced by the inhibitor component (hereinafter, inhibitor-influencing layer 30a and 30b) is formed on the interface of the dielectric layer 10 close to the internal electrode layer 20a and 20b. In case of ultrahigh capacity/thin MLCCs, a fraction of the interface layer is increased.

The inhibitor uses barium titanate ($BaTiO_3$, BT) with a smaller size than Ni used in the internal electrode as a main component, and BT has smaller size and lower crystallinity than BT powder applied to the dielectric layer. And since the interface between the dielectric and the electrode is used as a path for removing a binder during firing, a reducing atmosphere acts relatively. Therefore, the layer influenced by the inhibitor has relatively high frequency of oxygen vacancies and deteriorates withstand voltage characteristics, reliability, and capacity characteristics.

RELATED ART DOCUMENT

Patent Document

Patent Document 1: Japanese Patent Laid-open Publication No. 1996-241828

SUMMARY OF THE INVENTION

The present invention has been invented in order to overcome the above-described problems and it is, therefore, an object of the present invention to provide a multilayer electronic component with excellent electrical characteristics such as withstand voltage characteristics, accelerated life, and capacity by adding a Ca component to an inhibitor added to an internal electrode layer for a multilayer electronic component such as an MLCC to suppress the occurrence of oxygen vacancies as much as possible.

Further, it is another object of the present invention to provide a multilayer electronic component capable of suppressing the occurrence of oxygen vacancies in an inhibitor-influencing layer by adding a Ca component to an inhibitor added to an internal electrode layer when the inhibitor-influencing layer is formed on the interface between the internal electrode layer and a dielectric layer.

It is still another object of the present invention to provide a method for manufacturing a multilayer electronic component.

In accordance with one aspect of the present invention to achieve the object, there is provided a multilayer electronic component having a structure in which a dielectric layer and an internal electrode layer are alternately laminated, wherein the internal electrode layer includes metal powder and an inhibitor which is 0.5 to 20 mol % of a calcium (Ca) component based on 100 mol % of a barium titanate (BT) base material.

It is preferred that the inhibitor content is 0.5 to 20 wt % based on the weight of the metal powder.

In accordance with an embodiment of the present invention, it is preferred that the Ca component is included in the form of $CaCO_3$ or Ba—Ca—Si (BCS).

The Ba—Ca—Si (BCS) may consist of 20 to 25 mol % of Ba, 19 to 24.5 mol % of Ca, and 50 to 60 mol % of Si.

When the calcium (Ca) component is included in the form of BCS, it is preferred that the calcium (Ca) component is included in an amount of less than 4.5 mol % based on 100 mol % of the barium titanate (BT) base material.

Nickel or copper may be preferably applied as the metal powder of the internal electrode layer.

In accordance with an embodiment of the present invention, it is preferred that a thickness of the dielectric layer is 0.1 to 0.5 μm.

Further, in accordance with another aspect of the present invention to achieve the object, there is provided a multilayer electronic component having a structure in which a dielectric layer and an internal electrode layer are alternately laminated, wherein the internal electrode layer includes metal powder and an inhibitor which is 0.5 to 20 mol % of a calcium (Ca) component based on 100 mol % of a barium titanate (BT) base material to suppress the occurrence of oxygen vacancies in an inhibitor-influencing layer when the inhibitor-influencing layer is formed between the dielectric layer and the internal electrode layer by the movement of the inhibitor included in the internal electrode layer after sintering the laminate formed by alternately laminating the dielectric layer and the internal electrode layer.

It is preferred that the calcium (Ca) component included as the inhibitor does not react with the metal powder.

The metal powder may be nickel (Ni) or copper (Cu).

Further, in accordance with still another aspect of the present invention to achieve the object, there is provided a method for manufacturing a multilayer electronic component, including the steps of: forming a green sheet which becomes a dielectric layer, forming an internal electrode layer on the green sheet; laminating the green sheet on which the internal electrode layer is formed; and firing the laminated sheet, wherein the internal electrode layer includes metal powder and an inhibitor which is 0.5 to 20 mol % of a calcium (Ca) component based on 100 mol % of a barium titanate (BT) base material.

It is preferred that the inhibitor content is 0.5 to 20 wt % based on the weight of the metal powder.

It is preferred that the Ca component is included in the form of $CaCO_3$ or Ba—Ca—Si (BCS).

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, the present invention will be described in detail.

Terms used herein are provided to explain specific embodiments, not limiting the present invention. Throughout this specification, the singular form includes the plural form unless the context clearly indicates otherwise. Further, terms "comprises" and/or "comprising" used herein specify the existence of described shapes, numbers, steps, operations, members, elements, and/or groups thereof, but do not preclude the existence or addition of one or more other shapes, numbers, operations, members, elements, and/or groups thereof.

The present invention relates to a multilayer electronic component and a method for manufacturing the same that are capable of minimizing the occurrence of oxygen vacancies on the interface formed when an inhibitor component included in an internal electrode layer moves to a dielectric layer and implementing excellent electrical characteristics and electrode connectivity.

Figure 1:
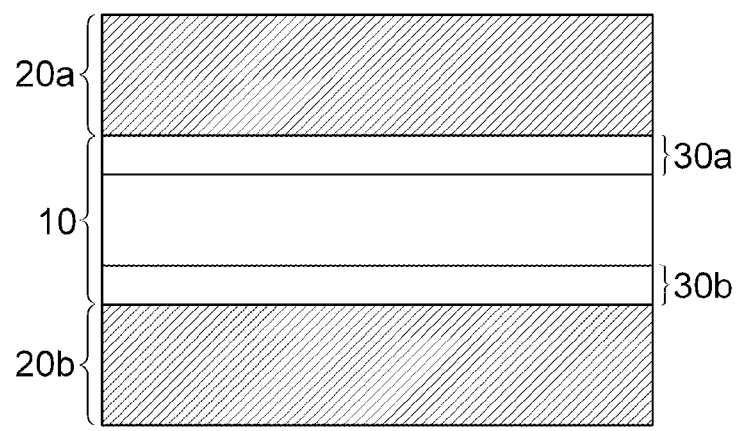
FIG. 1 is a schematic view of a structure for explaining an effect of an inhibitor of an internal electrode layer in an MLCC.
Figure 2:
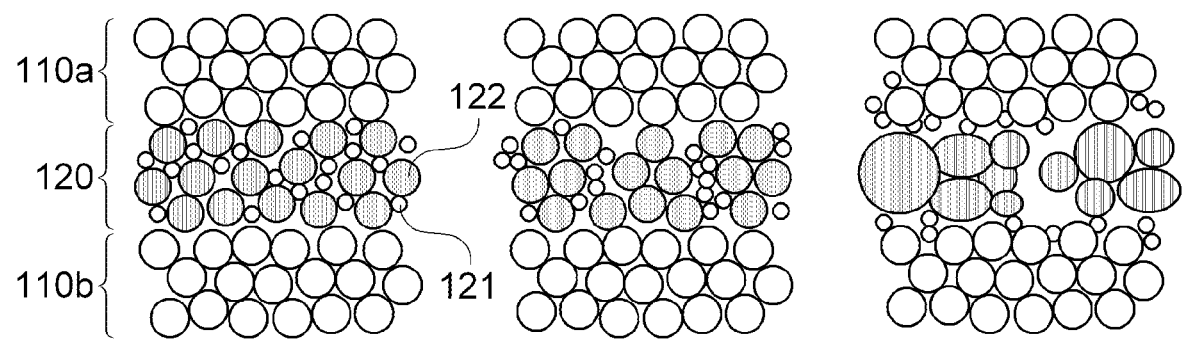
FIG. 2 is a schematic view showing a role of a typical inhibitor in an MLCC.

FIG. 2 shows a role of a typical inhibitor in manufacture of an MLCC which is a multilayer electronic component. Referring to this, when sintering a dielectric sheet in which an internal electrode layer 120 is formed between dielectric layers 110a and 110b, inhibitors 121 included in the internal electrode layer 120 perform a natural role of an inhibitor by suppressing the shrinkage starting of nickel metal 122 used as metal powder of the internal electrode layer 120 (1).

Next, the shrinkage of the nickel metal powder 122 starts at 700 to 900° C. and the necking of the nickel metal powder 122 starts so that agglomeration occurs between the metal nickel powders 122 and between the inhibitors 121 (2).

Finally, the inhibitors 121 leak from the internal electrode layer 120 and then move to be absorbed into the dielectric layers 110a and 110b or a separate inhibitor-influencing layer 130 is formed at more than 900° C. (3). The dielectric layers 110a and 110b react with the inhibitors introduced from the internal electrode layer 120 while sintering starts. Therefore, the composition of the inhibitor affects characteristics of the dielectric layer.

A multilayer electronic component in accordance with an embodiment of the present invention includes a dielectric layer and an internal electrode layer including metal powder and an inhibitor, and the inhibitor includes 0.5 to 20 mol % of a Ca component based on 100 mol % of a barium titanate base material.

The "inhibitor" used throughout the specification of the present invention means a material that is used with the metal powder in the internal electrode layer to play a role of reducing a firing temperature of the metal powder.

The present invention includes a Ca component as an inhibitor of an internal electrode layer, in a multilayer electronic component having a structure in which a dielectric layer and an internal electrode layer are alternately laminated.

The internal electrode layer consists of metal powder for forming an internal electrode and an inhibitor for adjusting a sintering property of the metal powder. Nickel or copper may be preferably applied as the metal powder of the internal electrode layer, and among them, nickel may be most preferably used.

Further, the inhibitor includes a material, which is the same as barium titanate used as a base material of the dielectric layer, as a main component and a Ca component as a sub-component.

It is preferred that the inhibitor content in accordance with the present invention is 0.5 to 20 wt %. When the inhibitor content is less than 0.5 wt %, electrode connectivity is reduced due to the difficulty in controlling the shrinkage of the electrode. Further, when exceeding 20 wt %, since the amount of the inhibitor leaking from the internal electrode layer is increased due to a high fraction of the inhibitor, it is impossible to satisfy electrical characteristics due to the deterioration of the electrode connectivity after final firing.

Further, it is preferred that the Ca component, which is used as the sub-component of the inhibitor in the internal electrode layer in accordance with the present invention, is included in an amount of 0.5 to 20 mol % based on 100 mol % of barium titanate (BT) which is the main component of the inhibitor. When the amount of the Ca component as the sub-component of the inhibitor is less than 0.5 mol % based on 100 mol % of barium titanate, reliability such as accelerated life may be deteriorated. Further, when the Ca component is excessively added in an amount of more than 20 mol %, on the contrary, reliability may be deteriorated due to the deterioration of the overall dispersibility.

In accordance with an embodiment of the present invention, it is preferred that the Ca component used as the sub-component of the base material is included in the form of $CaCO_3$ or Ba—Ca—Si (BCS). If the Ca component is added in the form of CaO, it is not easy to secure phase stability during a dispersion process. Therefore, it is advantageous that the Ca component is added in the form of $CaCO_3$ or Ba—Ca—Si (BCS, calcined phase formed by heating after mixing) with relatively high dispersibility.

Further, when the Ca component is included in the form of Ba—Ca—Si (BCS), it is preferred that the Ba—Ca—Si (BCS) consists of 20 to 25 mol % of Ba, 19 to 24.5 mol % of Ca, and 50 to 60 mol % of $SiO_2$ to synthesize a stable phase.

In accordance with an embodiment of the present invention, when the calcium (Ca) component is included in the form of BCS, it is preferred that the calcium (Ca) component is included in an amount of less than 4.5 mol % based on 100 mol % of a barium titanate (BT) base material. When the calcium component is included in an amount of more than 4.5 mol %, it is not preferred since the $SiO_2$ content included in the BCS is also increased to promote firing, thus greatly deteriorating electrode connectivity and having a bad influence on both of electrical characteristics and reliability.

Further, when using other metals other than Ca, for example, Mg as the sub-component of the inhibitor of the present invention, it is not preferred since they can react with Ni used as the metal powder well and thus easily form a Ni—Mg—O compound. Since Ca does not easily form a compound with Ni and thus can control the occurrence of oxygen vacancies in the inhibitor-influencing layer, it can be preferably used.

The multilayer component of the present invention may be formed using a barium titanate base material to which various additives commonly used as a dielectric layer are added, and it is preferred that a thickness of the dielectric layer is 0.3 to 1.2 μm.

Further, a multilayer electronic component in accordance with another embodiment of the present invention includes a dielectric layer and an internal electrode layer including metal powder and an inhibitor, and the inhibitor of the internal electrode layer includes 0.5 to 20 mol % of a Ca component based on 100 mol % of a barium titanate (BT) base material to suppress the occurrence of oxygen vacancies in an inhibitor-influencing layer when the inhibitor of the internal electrode layer moves to the interface between the dielectric layer and the internal electrode layer to form the inhibitor-influencing layer.

The "oxygen vacancy" used in the present invention means an empty space formed when oxygen leaks from a space where oxygen should be present in an oxide. For example, when additives (for example, an inhibitor) are mixed in $BaTiO_3$, the additives may be present in A and B sites in $BaTiO_3$ ($ABO_3$ structure) by a firing atmosphere (reduction) and so on and carbon is evaporated in the form of $CO_2$ by a de-binder and so on so that the space where oxygen should be present is vacant. That is, O has a −2 charge and when a space where oxygen should be present is vacant, oxygen vacancy with a +2 charge occurs. When the oxygen vacancy is moved by the applied electric field, reliability is deteriorated. The more the oxygen vacancies and the higher the applied temperature and voltage, reliability is more deteriorated due to increases in moving speed and amount.

In the present invention, since the internal electrode layer including metal powder and an inhibitor includes a Ca component as the sub-component of the inhibitor, it is possible to effectively control the occurrence of oxygen vacancies in the inhibitor-influencing layer formed on the interface between the internal electrode layer and the dielectric layer. Since the Ca component included in the internal electrode layer does not easily react with nickel metal used as the internal electrode, it is possible to minimize the occurrence of oxygen vacancies.

Further, a method for manufacturing a multilayer electronic component in accordance with another embodiment of the present invention includes the steps of forming a green sheet which becomes a dielectric layer, forming an internal electrode layer on the green sheet, laminating the green sheet on which the internal electrode layer is formed, and firing the laminated sheet, and the internal electrode layer includes metal powder and an inhibitor, wherein the inhibitor includes 0.5 to 20 mol % of a Ca component based on 100 mol % of a barium titanate (BT) base material.

A first step of manufacturing a multilayer electronic component in accordance with the present invention is a process of forming a green sheet which becomes a dielectric layer. The green sheet may be manufactured by coating a dielectric composition, which is used in a typical multilayer electronic component, with an appropriate method, and the coating method is not particularly limited.

The green sheet which becomes a dielectric layer may be formed with a thickness of 0.3 to 1.2 μm but not limited thereto.

Further, a second step is a process of forming an internal electrode layer on the green sheet. The internal electrode layer includes metal powder and an inhibitor, wherein the inhibitor includes 0.5 to 20 mol % of a Ca component based on 100 mol % of a barium titanate (BT) base material.

A method of forming the internal electrode layer on the green sheet is also not particularly limited, and any methods used in the typical multilayer electronic components can be used. The internal electrode layer in accordance with the present invention may be formed with a thickness of 0.3 to 1.0 μm but not limited thereto.

A third step is a process of laminating the green sheet on which the internal electrode layer is formed. The green sheet on which the internal electrode layer is formed may be laminated to have a thickness which meets a predetermined purpose.

A last step is a process of firing the laminated sheet. The internal electrode layer and the dielectric layer are fired according to a firing temperature. Generally, the metal powder, which constitutes the internal electrode layer, shrinks while being fired. At this time, the necking of the metal powder included in the internal electrode layer starts, and the Ca component as a sub-component of the inhibitor and the metal powder agglomerate with each other. Further, the firing of the dielectric layer starts when a temperature rises and the Ca component is pushed out from the internal electrode layer and then moves to the dielectric layer. The Ca component may be all absorbed into the dielectric layer or forms an inhibitor-influencing layer on the interface between the internal electrode layer and the dielectric layer.

In accordance with the present invention, since it is possible to suppress the formation of oxygen vacancies in the inhibitor-influencing layer by including the Ca component in the inhibitor, it is possible to overcome the deterioration of withstand voltage characteristics, reliability, and capacity.

It is preferred that the Ca inhibitor content is 0.5 to 20 wt % based on the weight of the metal powder, and it is preferred that the Ca component is included in the form of $CaCO_3$ or Ba—Ca—Si (BCS).

Hereinafter, preferred embodiments of the present invention will be described in detail. The following embodiments merely illustrate the present invention, and it should not be interpreted that the scope of the present invention is limited to the following embodiments. Further, although certain compounds are used in the following embodiments, it is apparent to those skilled in the art that equal or similar effects are shown even when using their equivalents.

Embodiment

Multilayer electronic components are manufactured while changing the composition and content of the following Table 1. The ultrahigh capacity MLCCs (dielectric thickness of less than 0.5 μm, internal electrode 0.6 μm) are manufactured using an inhibitor including barium titanate as a main component and a Ca component as a sub-component.

Further, the accelerated life of the manufactured ultrahigh capacity MLCCs is compared using DROP behavior of an IR value in high temperature and high voltage. Capacity and dissipation factor (DF) (dielectric loss) are measured as electrical characteristics and results thereof are shown in the following table 1.

TABLE 1

| Sample No. | Inhibitor | Inhibitor Content (wt %/Ni) | Ca component Content (mol % based on BT 100 mol %) | Accelerated Life | Electrical Characteristics |
|---|---|---|---|---|---|
| 1* | $BaTiO_3$ | 0.5 | 0 | X | ○ |
| 2* | $BaTiO_3$ | 5.0 | 0 | X | ○ |
| 3* | $BaTiO_3$ | 10.0 | 0 | X | ○ |
| 4 | $BaTiO_3 + CaCo_3$ | 0.5 | 1.0 | ○ | ○ |
| 5 | $BaTiO_3 + CaCo_3$ | 5.0 | 0.5 | ○ | ◎ |
| 6 | $BaTiO_3 + CaCo_3$ | 10.0 | 0.5 | ◎ | ◎ |
| 7 | $BaTiO_3 + CaCo_3$ | 10.0 | 1.0 | ◎ | ◎ |
| 8 | $BaTiO_3 + CaCo_3$ | 10.0 | 5.0 | ◎ | ○ |
| 9 | $BaTiO_3 + CaCo_3$ | 10.0 | 10.0 | ○ | ○ |
| 10 | $BaTiO_3 + CaCo_3$ | 10.0 | 15.0 | ○ | ○ |
| 11 | $BaTiO_3 + CaCo_3$ | 10.0 | 20.0 | X | ○ |
| 12 | $BaTiO_3 + CaCo_3$ | 15.0 | 15.0 | ○ | ○ |
| 13* | $BaTiO_3 + CaCo_3$ | 20.0 | 15.0 | X | X |
| 14 | $BaTiO_3 + BCS$ | 1.0 | 0.5 | ○ | ○ |
| 15 | $BaTiO_3 + BCS$ | 5.0 | 0.9 | ○ | ◎ |
| 16 | $BaTiO_3 + BCS$ | 10.0 | 1.5 | ◎ | ◎ |
| 17 | $BaTiO_3 + BCS$ | 15.0 | 3.2 | ○ | ○ |
| 18 | $BaTiO_3 + BCS$ | 19.0 | 4.4 | ○ | ○ |
| 19* | $BaTiO_3 + BCS$ | 20.0 | 4.5 | X | X |

Comment 1) *is out of the range of the present invention.
Comment 2) X: bad (NG or deterioration of characteristics), ○: good, ◎: very good
Comment 3) BCS consists of 20 to 25 mol % of BaO, 19 to 24.5 mol % of CaO, and 50 to 60 mol % of $SiO_2$.

As in the results of the above table 1, when the total amount of the inhibitor is greater than 20 wt % based on the weight of nickel, that is, metal powder, since a fraction of the inhibitor is high and thus the amount of the inhibitor leaking from the internal electrode layer is increased, electrode connectivity is deteriorated after final firing, thus deteriorating electrical characteristics.

Further, when the amount of the Ca component, which is used as the sub-component of the inhibitor, is greater than 20 mol % based on barium titanate (BT) as the main component of the inhibitor, since the overall dispersibility is deteriorated, reliability is rather deteriorated.

Further, when adding Ca in the form of calcined BCS, the deterioration of the reliability due to the deterioration of the dispersibility does not occur, but when Ca is added in an amount of more than 4.5 mol, it is not preferred since the $SiO_2$ content included in the BCS is also increased to promote firing, thus greatly deteriorating electrode connectivity and having a bad influence on both of electrical characteristics and reliability.

According to the present invention, it is possible to provide an internal electrode which is used in manufacture of multilayer electronic components such as a multilayer ceramic condenser (MLCC) and uses a Ca inhibitor for improving characteristics of the MLCC by suppressing shrinkage of an internal electrode to high temperature as much as possible.

Further, the present invention can provide a multilayer electronic component that can implement excellent electrical characteristics and electrode connectivity by adding a Ca component to an internal electrode layer as an inhibitor to minimize the occurrence of oxygen vacancies in an inhibitor-influencing layer on the interface between the internal electrode layer and a dielectric layer formed when the inhibitor component included in the internal electrode layer moves to the dielectric layer.

What is claimed is:
1. A multilayer electronic component comprising:
a dielectric layer alternately laminated with an internal electrode layer; and an inhibitor-influencing layer formed between the dielectric layer and the internal electrode layer, wherein the internal electrode layer comprises a metal component and an inhibitor including a barium titanate (BT) base material and a calcium (Ca) component, not including magnesium (Mg), and wherein the calcium (Ca) component is included in the form of Ba—Ca—Si (BCS).

2. The multilayer electronic component according to claim 1, wherein the inhibitor content is 0.5 to 20 wt % based on the weight of the metal component.

3. The multilayer electronic component according to claim 1, wherein the calcium (Ca) component included in the form of BCS is included in an amount of less than 4.5 mol % based on 100 mol % of the barium titanate (BT) base material.

4. The multilayer electronic component according to claim 1, wherein the metal component of the internal metal layer is nickel (Ni) or copper (Cu).

5. The multilayer electronic component according to claim 1, wherein a thickness of the dielectric layer is 0.3 to 1.2 μm.

6. The multilayer electronic component according to claim 1, wherein a thickness of the internal electrode layer is 0.3 to 1.0 μm.

7. A multilayer electronic component comprising:

a dielectric layer and an internal electrode layer alternately laminated; and an inhibitor-influencing layer formed between the dielectric layer and the internal electrode layer by the movement of the inhibitor included in the internal electrode layer after sintering the laminate formed by alternately laminating the dielectric layer and the internal electrode layer, wherein the internal electrode layer comprises a metal component and an inhibitor including a barium titanate (BT) base material and a calcium (Ca) component to suppress the occurrence of oxygen vacancies in the inhibitor-influencing layer, not including magnesium (Mg), and wherein the calcium (Ca) component is included in the form of Ba—Ca—Si (BCS).

8. The multilayer electronic component according to claim 7, wherein the calcium (Ca) component included as the inhibitor does not react with the metal component of the internal electrode layer.

9. The multilayer electronic component according to claim 8, wherein the metal component is nickel (Ni) or copper (Cu).

10. A method for manufacturing a multilayer electronic component, comprising:

forming a green sheet which becomes a dielectric layer;

forming an internal electrode layer on the green sheet;

laminating the green sheet on which the internal electrode layer is formed; and firing the laminated sheet, wherein the internal electrode layer comprises a metal component and an inhibitor including a barium titanate (BT) base material and a calcium (Ca) component, not including magnesium (Mg), and and an inhibitor-influencing layer is formed between the dielectric layer and the internal electrode layer, wherein the calcium (Ca) component is included in the form of Ba—Ca—Si (BCS).

11. The method for manufacturing a multilayer electronic component according to claim 10, wherein the inhibitor content is 0.5 to 20 wt % based on the weight of the metal component.

* * * * *